May 28, 1929. A. L. RUTHVEN 1,715,250
CONTINUOUS TRAIN CONTROL
Filed March 18, 1925
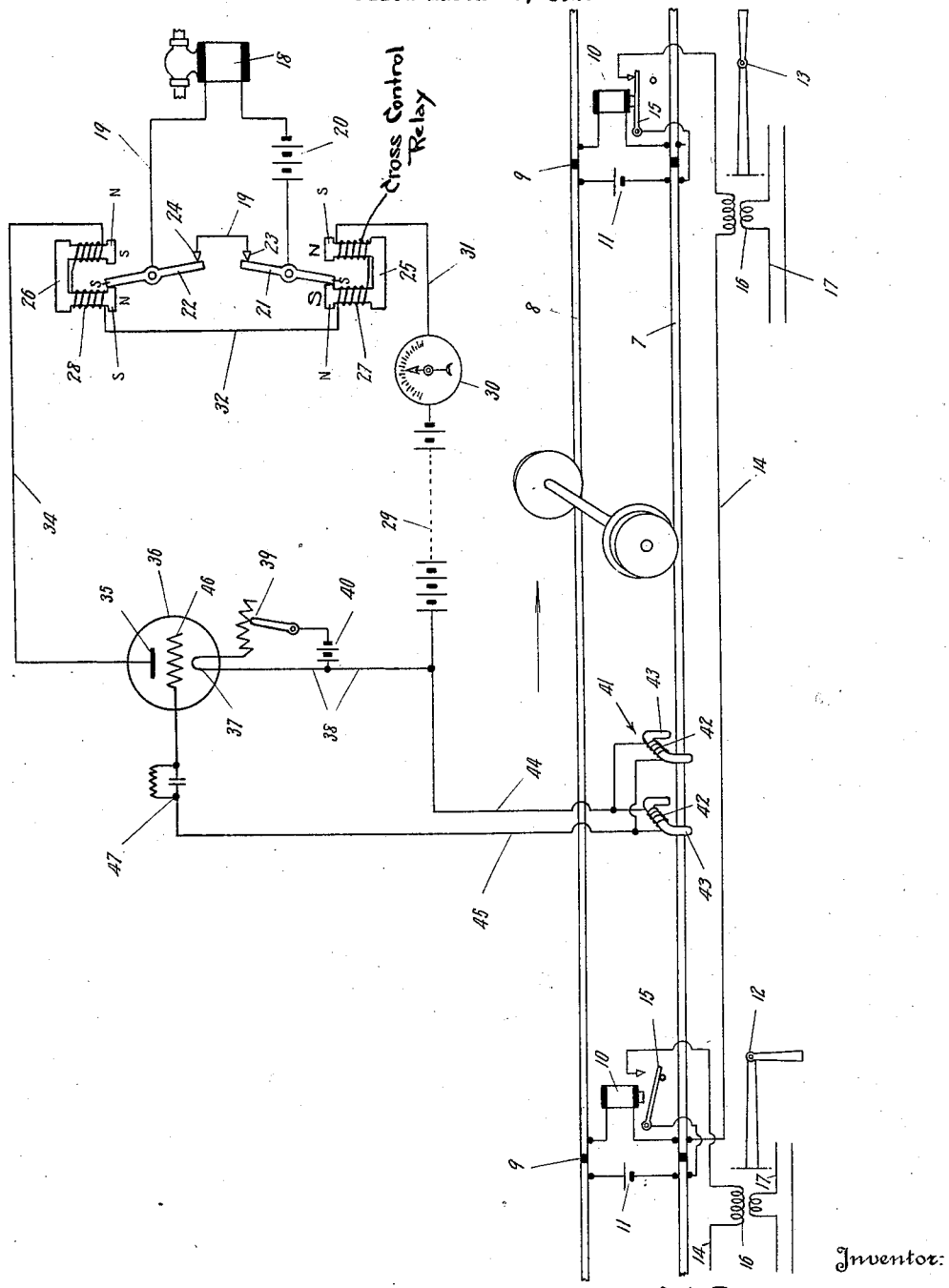

Patented May 28, 1929.

1,715,250

UNITED STATES PATENT OFFICE.

ALFRED L. RUTHVEN, OF ROCHESTER, NEW YORK.

CONTINUOUS TRAIN CONTROL.

Application filed March 18, 1925. Serial No. 16,448.

The present invention relates to automatic train control, and aims to provide a novel and improved continuous control apparatus whereby a vehicle when travelling in a protected block will be under continuous control in order that the vehicle may proceed unrestricted as to speed if the block in advance is unoccupied, whereas the vehicle will be retarded or placed under danger conditions if the block ahead is occupied, such control changing or occurring at any point in the block in which the vehicle is moving, so as to expedite traffic.

Another object is the provision of a novel electrical vehicle equipment whereby energy picked up from the track controls a brake or signal device in a novel and effective manner.

It is also an object of the invention to provide such an apparatus which is extremely simple in construction, economical to install and maintain, and reliable in operation, with failures on the side of safety.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein the figure is a diagrammatical view of the apparatus.

The traffic rails 7 and 8 of the track have insulated joints 9 dividing the track into blocks, as usual, and an electro-magnet 10 is bridged across the rails at the entrance end of each block, while a battery 11 is bridged across the rails at the exit end of each block, so that when the block is unoccupied the current from the battery will flow through the rails as a circuit to energize the magnet 10. As shown, there is a semaphore 12 for the full block illustrated, at the entrance end of said block, and there is a semaphore 13 at the entrance end of the next block, the semaphore 12 being shown in danger position and the semaphore 13 in clear position.

The rail 7 of each block is included in a vehicle control trackside circuit including the conductor 14 connected to the opposite ends of the rail 7 and having a switch 15 under the influence of the magnet 10 of the block in advance, whereby said switch is closed to complete the circuit when the magnet 10 of the block in advance is energized. Thus, the magnet 10 at the semaphore 13 controls the vehicle control trackside circuit of the full block shown in rear of the semaphore 13, while the magnet 10 of the semaphore 12 controls the next block in rear. Each conductor 14 is supplied with alternating or pulsating current, such as by being connected through a transformer 16 with a supply line or circuit 17. Therefore, when a switch 15 of a trackside circuit is closed, alternating or pulsating current will flow in the rail 7 of the corresponding block to supply energy to the pick-up or responsive element of the vehicle travelling in the block.

The vehicle equipment includes an electromagnet 18 controlling, through an air valve or otherwise, the brakes of the vehicle or train, in order to apply the brakes when said magnet is deenergized, or said magnet may control a signal device for indicating a danger condition when the magnet is deenergized. The magnet 18 is disposed in a normally closed circuit 19 including the battery 20 or other source of electrical energy, and relay switches 21 and 22 bearing against the respective contacts 23 and 24.

The switches 21 and 22 are parts of polarized relays, said switches being portions of polarized armatures of said relays. The relays include the permanent magnets 25 and 26, which are of U-shape as shown, and the switches or armatures 21 and 22 have one of their poles disposed between the poles of the respective magnets 25 and 26. As shown, the armature 21 has its south pole located between the poles of the magnet 25, and the left hand pole of said magnet is a north pole, while the right hand pole is a south pole, in order that when the permanent magnet 25 predominates the armature 21 is attracted to the left hand or north pole of the magnet 25 to move the switch or armature 21 against the contact 23 as shown. The switch or armature 22 has its south pole located between the left and right hand poles of the permanent magnet 26 which are south and north poles, respectively, whereby when the permanent magnet 26 predominates the armature 22 is attracted to the right or north pole which will open the switch or armature 22.

The polarized relays include the coils or windings 27 and 28 on the arms of the magnets or cores 25 and 26, respectively, and said coils are disposed in an electrical circuit including the battery 29, voltmeter 30, conductor 31, winding 27, conductor 32, winding 28, conductor 34, plate 36 of an electrical valve or electron tube 36, filament 37 of said valve or tube, and conductor 38. The filament 37 is energized or rendered incandescent by being disposed in the circuit including the rheostat or variable resistance 39 and battery 40.

The circuit of the windings 27 and 28 of the polarized relays, is controlled by a receiving or pick-up circuit including pick-up or responsive elements or devices 41. As shown, two of the pick-up elements 41 are employed, being spaced apart longitudinally of the track, and each of them includes an inverted U-shaped core 43 straddling or disposed astride the rail 7 and having a coil or winding 42 thereon. The coils 42 are connected (preferably in parallel) in a circuit including the conductor 45, conductor 38, filament 37, grid 46 of the valve or tube 36, and conductor 45 which has the grid capacity and resistance 47.

The valve or tube 36 is of the well known audion type, having the three electrodes, and in tests made the control track circuit including the rail 7 and conductor 14 was supplied with a current of two volts (60 cycle), while the battery 29 was of a strength of 135 volts, the coils or windings 27 and 28 each having a resistance of 10,000 ohms. The battery 20 can be of any suitable strength needed for the electro-magnet 18.

It was discovered that when the pick-up elements 41 received energy from the rail 7 supplied from the transformer 16, this had the effect on the voltmeter 30, graduated for millivolts, of indicating an increase in voltage. The armature 21, permanent magnet or core 25 and coil 27 of one relay are adjusted or set so that the magnetic field of the permanent magnet 25 opposes the magnetic field of the coil 27, with the magnetic field of the permanent magnet normally predominating, and should there be an abnormal increase in voltage in the relay circuit, such as by a short-circuit, the magnetic field of the coil 27 would over-power the permanent magnet 25 thereby reversing the poles of the relay and throwing the switch or armature 21 away from the contact 23. This relay (including armature 21, permanent magnet 25 and coil 27) is a control relay, to open the circuit 19 at the contact 23, when there is an abnormal increase in voltage in the relay circuit, and to close the circuit 19 at said contact 23 when there is normal voltage in the relay circuit.

The other polarized relay including the armature 22, permanent magnet 26 and coil 28, is a control relay to break the circuit 19 in the event that the voltage of the coil 28 falls below a predetermined safe amount. Thus, when the coil 28 receives the required voltage of current, with the elements 41 energized, the magnetic field of the coil 28 overpowers the magnetic field of the permanent magnet 26, and since the polarity of the field due to the energized coil 28 is reverse to that of the permanent magnet 26, the armature 22 is held against the contact 24, whereas if the voltage drops below a predetermined amount (with the elements 41 deenergized), for which the relay is set or adjusted, the reduced magnetic field of the coil 28 fails in strength and the permanent magnet 26 will then predominate so as to reverse the armature 22 and open the circuit 19 at the contact 24.

The operation of the apparatus is as follows: When the block in advance of the semaphore 13 is unoccupied, the magnet 10 at said semaphore is energized, to close the switch 15 so that the rail 7 of the block between the semaphores 12 and 13 will be energized with alternating or pulsating current from the transformer 16, such current being of low voltage and of comparatively low cycle. The responsive elements 41 will pick up feeble energy from the rail 7 which bridges the gap between the filament 37 and grid 46. This has the effect of decreasing the resistance in the gap between the plate 35 and filament 37, thereby increasing the voltage in the coils 27 and 28. The switch 21 is normally closed, and as hereinbefore indicated is only opened by an abnormal increase in voltage. The increased voltage in the coil 28, however, will enable said coil to overpower the magnet 26, thereby closing the switch 22. The magnet 18 is therefore energized to give a clear signal or to release the brakes so that the vehicle can proceed without speed restriction.

Should the block in advance be or become occupied with the vehicle entering or travelling within the block between the semaphores 12 and 13, the magnet 10 at the semaphore 13 will be deenergized because the occupancy of the block will produce a short-circuit depriving the magnet 10 of energy. The switch 15 at the semaphore 13 will therefore drop open, thereby opening the circuit of the rail 7 of the full block shown. The elements 41 are therefore deenergized, which results in added resistance in the valve or tube 36, and the voltage in the circuit of the coils 27 and 28 is therefore decreased. Although the switch 21 remains closed, the coil 28 being partially deenergized will result in its magnetic field being weakened below that of the permanent magnet 26, so that the switch 22 is reversed and removed from the contact 24, thereby opening the circuit 19 and deenergizing the magnet 18 to apply the brakes or give a danger indication.

Should the block in advance become vacant, this will immediately restore clear conditions, so that the vehicle can proceed without restriction, and it will be noted that both clear and danger conditions may be produced at any point in the block, thereby obtaining continuous control and expediting traffic.

By using the pair of longitudinally-spaced pick-up elements 41 the vehicle may readily pass the dead portions of the track at the adjacent ends of the blocks, especially inasmuch as it may not be possible to connect the ends of the conductors 14 directly to the ends of rail sections. This will leave short portions at the insulated joints 9 which will not be energized. Therefore, even though both blocks may be under clear conditions, if the receiving or pick-up device is over the dead portion between the blocks, a danger signal or indication will be given and the vehicle may be held at a stand-still. However, with the two elements 41, one of them will be over an active portion of the rail while the other may be over the dead or blind spot. This arrangement is also of advantage in that it is unnecessary to make special provision for running the control current in the rail sections directly up to the insulated joints 9, so that the ends of the conductors 14 may be connected to the rail at short distances from said joints.

Having thus described the invention, what is claimed as new is:—

1. Vehicle controlling apparatus comprising an alternating current trackside circuit controlled by traffic conditions and including a single rail only of the track, in combination with a vehicle equipment including electrical controlling means, an electrical circuit of high voltage having a relay controlling said electrical means for energizing and deenergizing said electrical means upon increase and decrease, respectively, of the voltage of said circuit, a pick-up element cooperable with said rail, an electrical connection between said element and high voltage circuit for decreasing and increasing the resistance of said high voltage circuit, respectively, when said element picks up and fails to pick up energy from said rail, and means in said high voltage circuit operable for deenergizing said electrical means when the voltage in said high voltage circuit increases to an abnormal amount.

2. Vehicle controlling apparatus comprising in combination with an alternating current trackside circuit controlled according to traffic conditions and including a single rail only of the track, a vehicle equipment including a pick-up element to receive energy from said rail when energized, electrical vehicle controlling means, a circuit including a source of energy and a relay controlling said means and arranged to energize said means when maximum current flows in the second named circuit, an electrical connection between said element and second named circuit for decreasing the resistance in said second named circuit when said element receives energy from said rail so that said relay is in position for the energization of the controlling means, and a second relay in the second named circuit also controlling said controlling means for deenergizing the controlling means when the voltage in the second named circuit increases to an abnormal amount.

3. Vehicle controlling apparatus including an alternating current trackside circuit controlled according to traffic conditions and including a single rail only of the track, in combination with a vehicle equipment including a pick-up element to receive energy from said rail when energized, electrical vehicle controlling means, a circuit including a source of energy and means controlling said controlling means and arranged to energize the controlling means when maximum current flows in the second named circuit, a variable resistance means in circuit with said pick-up element and disposed in the second named circuit and operable for increasing the flow of current in the second named circuit when said element receives energy from said rail, and safety means in the second named circuit controlling the controlling means to deenergize said controlling means when the voltage in the second named circuit increases to an abnormal amount.

4. Vehicle controlling apparatus comprising an alternating current trackside circuit 95 controlled according to traffic conditions, in combination with a vehicle equipment including a pick-up element to receive energy from said circuit when energized, electrical vehicle controlling means, a circuit including a source of electrical energy and a relay having a coil in the circuit, a permanent magnet and an armature controlling said controlling means, said permanent magnet being arranged to move said armature to a position for the deenergization of said controlling means when the voltage in the second named circuit is decreased below the maximum voltage, and said coil when energized by said maximum voltage opposing the permanent magnet and being arranged to move said armature to energize the controlling means, and an electrical connection between said pick-up element and second named circuit whereby the reception of energy by said element decreases the resistance in the second named circuit.

5. Vehicle controlling apparatus according to claim 1 and including a second relay in the second named circuit having a permanent magnet, a coil in the circuit and an armature also controlling the controlling means, the permanent magnet and coil of the second relay both controlling said armature of the relay and the influence of the coil predominating to normally hold said armature in position for the energization of the controlling means, whereby when the voltage in the second named circuit increases above an abnormal amount the permanent magnet of the second relay moves the armature of said relay to a position to deenergize the controlling means.

6. Vehicle controlling apparatus comprising an alternating current trackside circuit controlled according to traffic conditions, in combination with a vehicle equipment including a pick-up element to receive energy from said circuit when energized, electrical vehicle controlling means, a circuit including a source of electrical energy and a polarized relay controlling said controlling means and having two elements with opposing magnetic fields so arranged that one magnetic field predominates to energize said controlling means when the relay is energized by maximum voltage in the second named circuit and that the other magnetic field predominates for the deenergization of said controlling means when there is a predetermined drop in voltage in the second named circuit, and variable resistance means in the second named circuit controlled electrically by said pick-up element to decrease the resistance in the second named circuit when said element receives energy from the trackside circuit.

7. Vehicle controlling apparatus according to claim 3, and including a second polarized relay in the second named circuit having two elements with opposing magnetic fields so arranged that one magnetic field predominates for the energization of said controlling means when the second relay is energized by normal voltage in the second named circuit and that the other magnetic field predominates to deenergize the controlling means when there is an abnormal increase of current in the second named circuit.

8. Vehicle controlling apparatus including an alternating current trackside circuit adapted to be energized by current of low voltage and cycle and controlled according to traffic conditions, in combination with a vehicle equipment including electrical vehicle controlling means, a circuit having a source of high voltage current and a high resistance relay controlling said controlling means and arranged to energize the controlling means when there is a predetermined increase in voltage in the relay, an electron tube in the second named circuit providing a high resistance therein, a pick-up element arranged to receive energy from said trackside circuit when energized and electrically connected with said electron tube to decrease the resistance thereof in the second named circuit when said element receives energy from the trackside circuit, and a second high resistance relay in the second named circuit also controlling said controlling means and arranged to deenergize said controlling means when there is an abnormal increase in voltage in the second named circuit.

9. Vehicle controlling apparatus comprising, in combination, a vehicle track having its rails provided with insulated joints dividing the track into blocks, trackside circuits each including a rail of the track in the corresponding block, and a vehicle equipment including pick-up elements cooperable inductively directly with said rails to receive energy therefrom, and including electrically controlled translating means controlled in the same manner by either of said elements and maintained in normal position by the reception of energy by either of said elements, said elements being spaced apart longitudinally of the track to such an extent that when passing an insulated joint, at least one of said elements is in a position to cooperate inductively with one of the rails of the trackside circuits to avoid interrupted control when passing from one block to the next.

10. Vehicle controlling apparatus comprising, in combination, a vehicle track having its rails provided with insulated joints dividing the track into blocks, trackside circuits each including a rail at the same side of the track in the corresponding block, and a vehicle equipment including pick-up elements cooperable inductively directly with the rails at said side of the track to receive energy therefrom, and including electrically controlled translating means controlled in the same manner by either of said elements and maintained in normal condition by the reception of energy by either of said elements, said elements being spaced apart longitudinally of the track to such an extent that when passing an insulated joint at least one of said elements is in a position to cooperate inductively with one of the rails of the trackside circuits at said side of the track to avoid interrupted control when passing from one block to the next.

In testimony whereof I hereunto affix my signature.

ALFRED L. RUTHVEN.